United States Patent [19]

Churchich

[11] Patent Number: 4,757,588

[45] Date of Patent: Jul. 19, 1988

[54] PUSH-ON HOSE PLIERS

[76] Inventor: Ljudo Churchich, 1777 Agate St., Maplewood, Minn. 55117

[21] Appl. No.: 50,042

[22] Filed: May 15, 1987

[51] Int. Cl.[4] .............................................. F16L 35/00

[52] U.S. Cl. ........................................ 29/235; 29/237; 29/268

[58] Field of Search ....................... 7/125; 81/420, 426, 81/426.5, 303, 305, 304, 311, 312; 29/235, 237, 268

[56] References Cited

U.S. PATENT DOCUMENTS

| | | | |
|---|---|---|---|
| 1,170,334 | 2/1916 | Riggs | 81/303 |
| 2,815,728 | 12/1957 | Fenimore | 81/311 |
| 2,958,125 | 11/1960 | Nichols | 29/237 |
| 3,233,313 | 2/1966 | Roth | 29/235 |
| 3,299,496 | 1/1967 | Christensen | 29/237 |
| 4,257,135 | 3/1981 | Moebius | 29/268 |
| 4,483,056 | 11/1984 | Schwalm et al. | 29/237 |

FOREIGN PATENT DOCUMENTS

| | | | |
|---|---|---|---|
| 473900 | 5/1951 | Canada | 29/268 |
| 703853 | 2/1954 | United Kingdom | 29/268 |

OTHER PUBLICATIONS

McMaster Carv Supply Catalog, p. 1201, Chicago, Ill. 60680.

*Primary Examiner*—Robert C. Watson
*Attorney, Agent, or Firm*—Burd, Bartz & Gutenkauf

[57] ABSTRACT

A pliers for inserting the ends of hoses onto hose fittings. The pliers include a first set of jaws adapted to engage the fitting, a second set of jaws for grasping the end of a hose, and handles which are movable in a pincer action to force the end of the hose over the end of the fitting. The fitting jaws are spring biased to adapt to fittings of varying sizes. The hose engaging jaws lock in place on the hose to facilitate assembly of hose and fitting.

9 Claims, 2 Drawing Sheets

PUSH-ON HOSE PLIERS

BACKGROUND OF THE INVENTION

1. Field of the Invention

This invention relates to a tool for assembling hose and hose fittings. The tool is in the form of pliers for pushing one end of a length of hose onto a fitting. The tool is especially adapted for forcing thick-walled hose and tubing, such as pressure hoses, onto hose fittings.

A myriad of applications require semi-permanent connections between rubber or rubber-like hoses and metal fittings. Assembly requires stretching of the end of the hose so as to form a tight leak-proof seal between the inside surface of the hose or tubing and the outside surface of a fitting. The fitting connection is generally a nipple having annular ribs or barbs over which the hose is forced in order to prevent accidental separation of the hose and fitting. Typical applications include pressure cylinders, manifolds, and the like. Where the hose or tubing is relatively thin-walled and elastic, assembly is relatively easy. However, where the hose or tubing is relatively thick-walled and inelastic, then stretching of the hose to permit assembly onto a fitting is difficult. Where many assemblies must be made, the task is tedious and tiring.

THE PRIOR ART

The only known tool especially adapted for connecting hose and hose fittings is a commercially available assembler. This tool includes a base having a vise at one end for holding the hose and a lever operated plunger for pushing the fitting into the end of the hose. This tool is portable, or it may be permanently mounted. However, even when portable, it is not suitable for inserting a hose onto a fitting in place, such as in a manifold housing, or the like.

SUMMARY OF THE INVENTION

Broadly stated, the present invention is directed to a push-on hose pliers for assembling hose and hose fittings. The pliers comprise a first jaw assembly supported at one end of a first elongated handle and adapted to engage a hose fitting, and a second jaw assembly supported at one end of a second elongated handle and adapted to engage the end of a piece of hose to be pushed onto the fitting. The centers of the jaws of both assemblies are in approximately longitudinal alignment. A pivotal connection between the handles spaced inwardly from the jaw assemblies permits the handles to be worked in a pincer movement to move the jaw assemblies toward one another and force the end of the hose onto the fitting. Each jaw assembly includes a fixed and a movable jaw to adapt the tool to hoses and fittings of varying sizes. The hose jaw assembly clamps onto the hose and locks in place.

BRIEF DESCRIPTION OF THE DRAWINGS

The invention is illustrated by the accompanying drawings in which corresponding parts are identified by the same numerals and in which.

DETAILED DESCRIPTION OF THE PREFERRED EMBODIMENT

Figure 1:
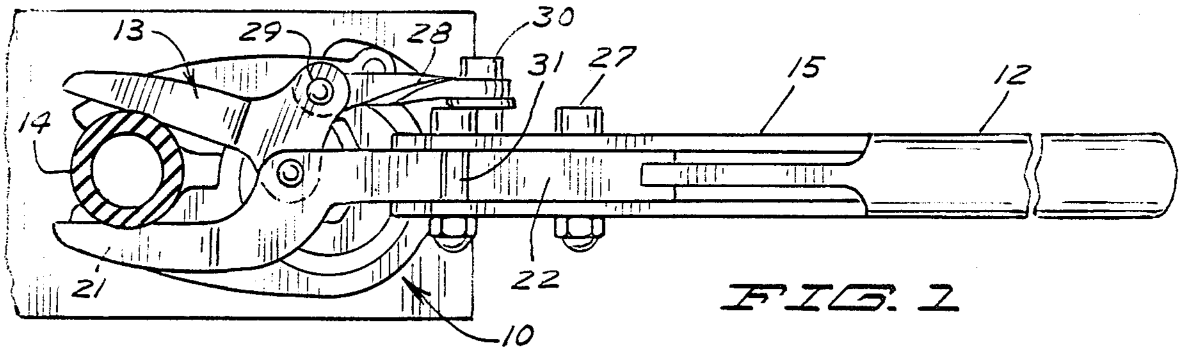
FIG. 1 is a side elevation showing the hose engaging jaw assembly as initially placed to engage a segment of hose.
Figure 2:
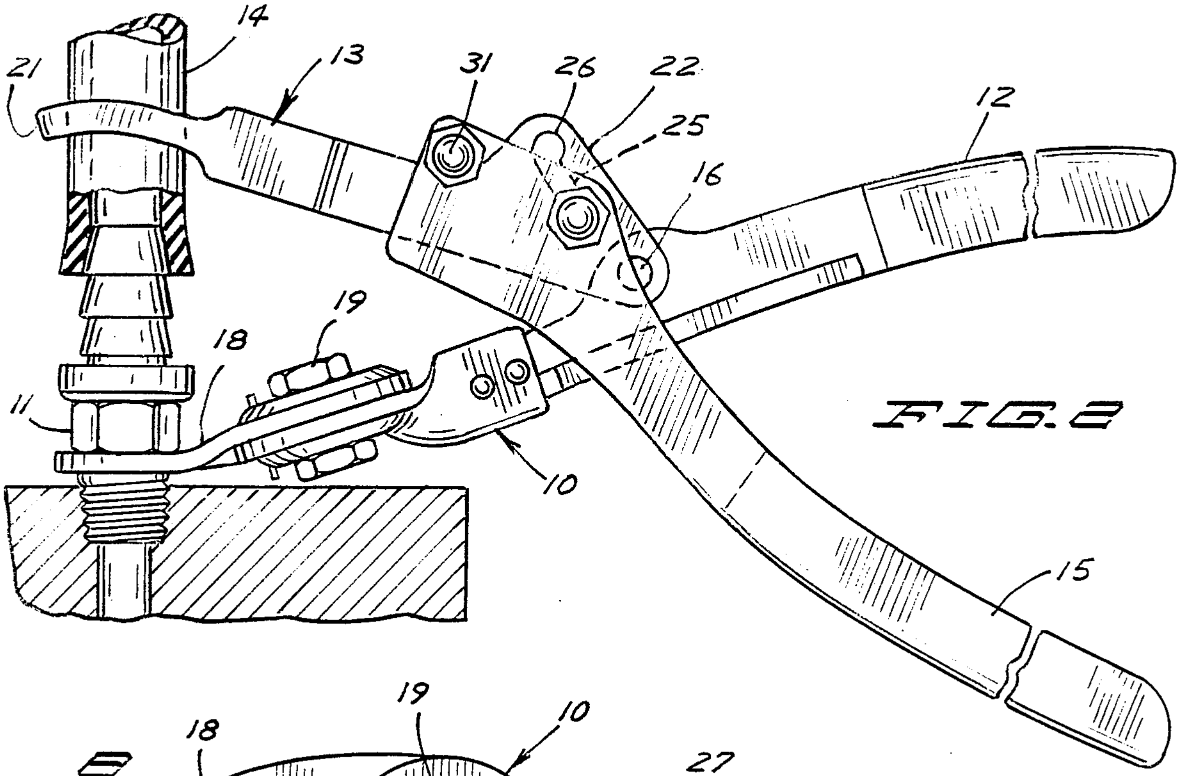
FIG. 2 is a plan view showing the hose partially started on the end of the hose fitting, engaged by the hose jaws but not yet locked in place.
Figure 3:
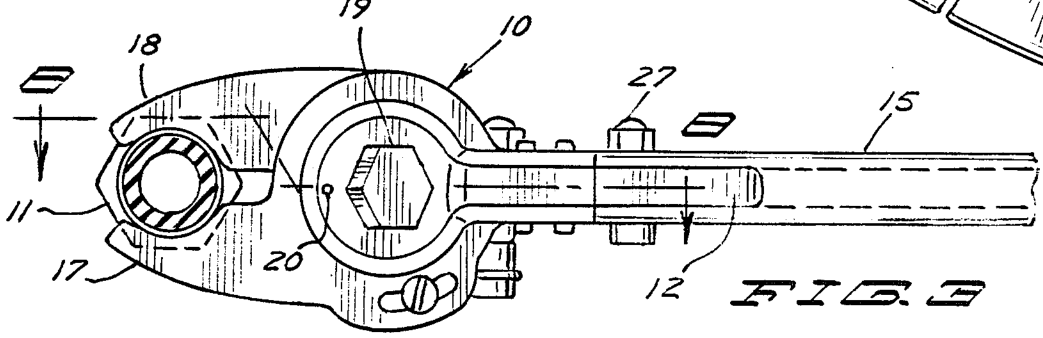
FIG. 3 is an opposite side elevation showing the fitting engaging jaws on a hose fitting.
Figure 4:
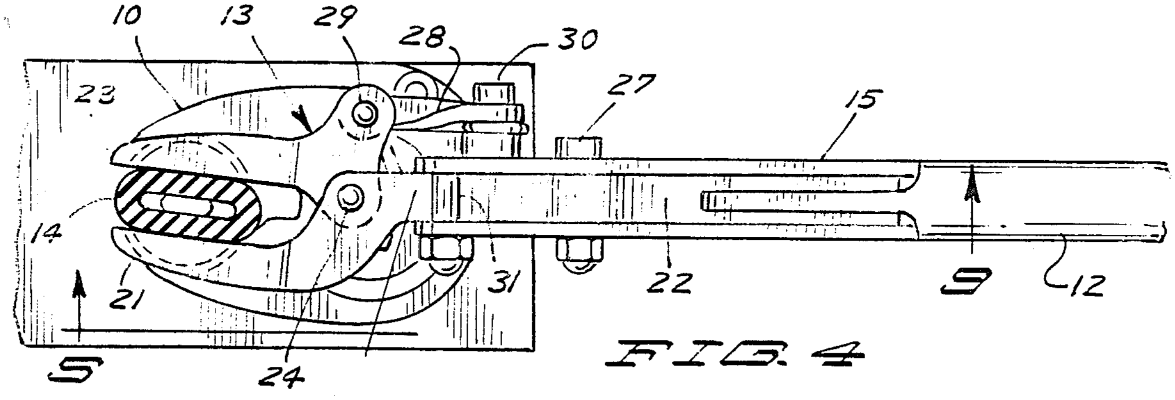
FIG. 4 is an elevation similar to FIG. 1 but showing the hose squeezed between the locked hose engaging jaws.
Figure 5:
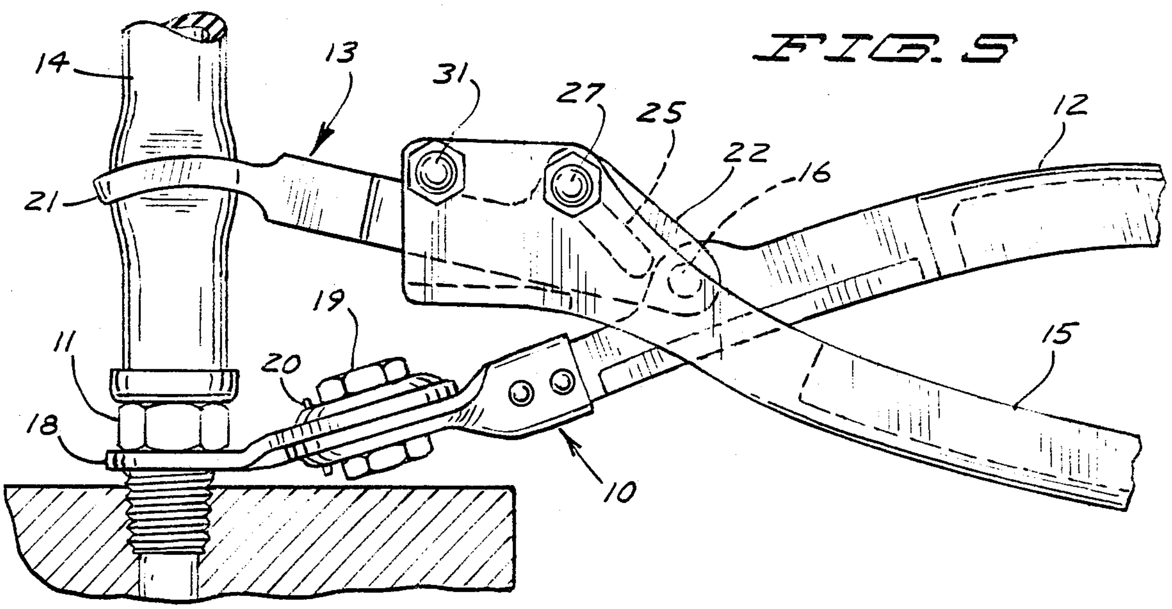
FIG. 5 is a plan view; similar to FIG. 2, showing the hose jaws in locked position after assembly of hose and fitting just prior to release of the tool.

Referring now to the drawings, the push-on hose pliers for assembling hose and hose fittings according to the present invention comprises a first jaw assembly, indicated generally at 10, which is adapted to engage a hose fitting 11 and is supported at one end of an elongated handle 12. The pliers also includes a second jaw assembly, indicated generally at 13, which is adapted to engage a segment of hose or tubing 14 adjacent its end and which is supported at the end of a second elongated handle 15. The handles 12 and 15 are disposed in an X-configuration and pivotally connected at 16 at an intermediate point spaced inwardly from the jaw assemblies. The push-on hose pliers functions in a pincer movement with the jaw assemblies being moved toward one another upon movement of the opposite ends of the handles toward one another.

Figure 8:
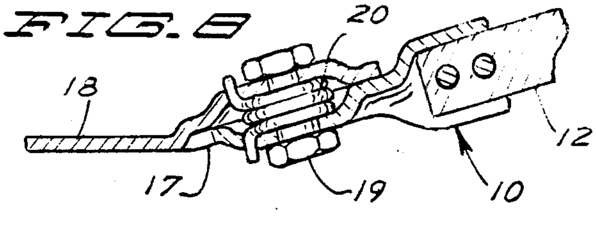
FIG. 8 is a fragmentary section on the line 8—8 of FIG. 3 and in the direction of the arrows.

The first jaw assembly 10 includes a fixed jaw 17 rigidly secured to the end of handle 12 and a movable jaw 18 pivotally connected at 19 to the fixed jaw. The movable jaw 18 is spring biased in normally closed position by means of tension spring 20 (FIG. 8). Jaws 17 and 18 each have inwardly facing arcuate recesses for engaging varying sizes of fittings 11. As is well understood, most hose fittings are threaded to adapt them to be secured in a housing wall, or the like, and are provided with a hexagonal or other polygonal head or base to facilitate screwing the fitting into the threaded opening. The jaw recesses are adapted to engage the fitting threads immediately adjacent to the head or base. The sides of jaws 17 and 18 adjacent the jaw recesses engage the underside of the fitting head to permit the hose engaging jaws to exert force opposite to that of the fitting jaws.

The second jaw assembly 13 includes a fixed hose engaging jaw member 21 which is rigidly supported at one end of a cam link 22. The opposite end of cam link 22 is pivotally attached to the first handle 12 at 16, this being the pivotal connection between handles 12 and 15. The second jaw assembly also includes a movable hose engaging jaw member 23 which is pivotally connected at 24 to the fixed jaw member 21.

Figure 6:
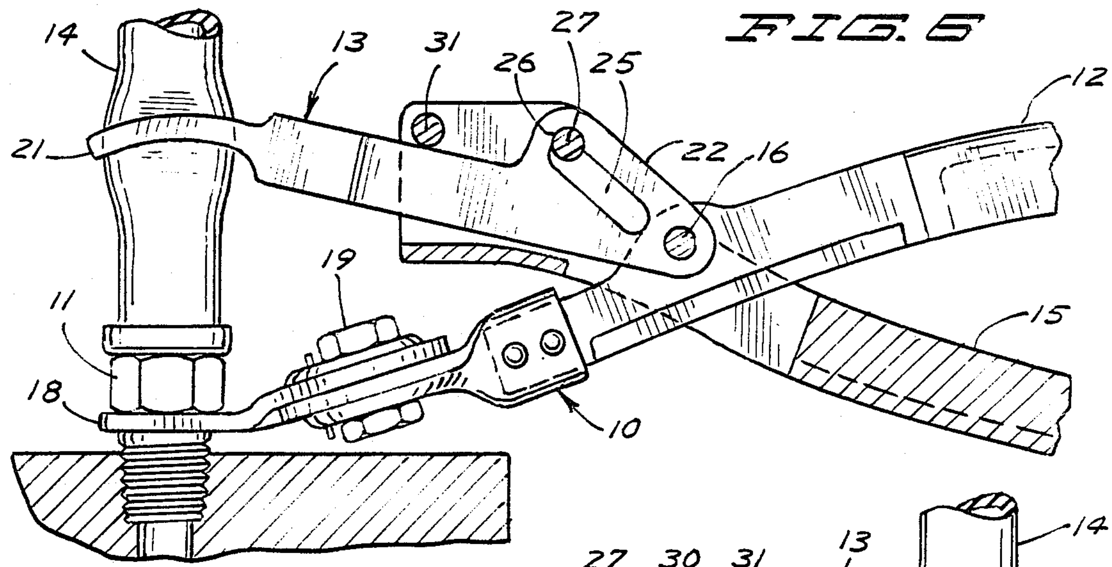
FIG. 6 is a similar view, showing a portion of one handle removed to expose hidden structure, FIG. 6 being a section on the line 6—6 of FIG. 4 and in the direction of the arrows.
Figure 7:
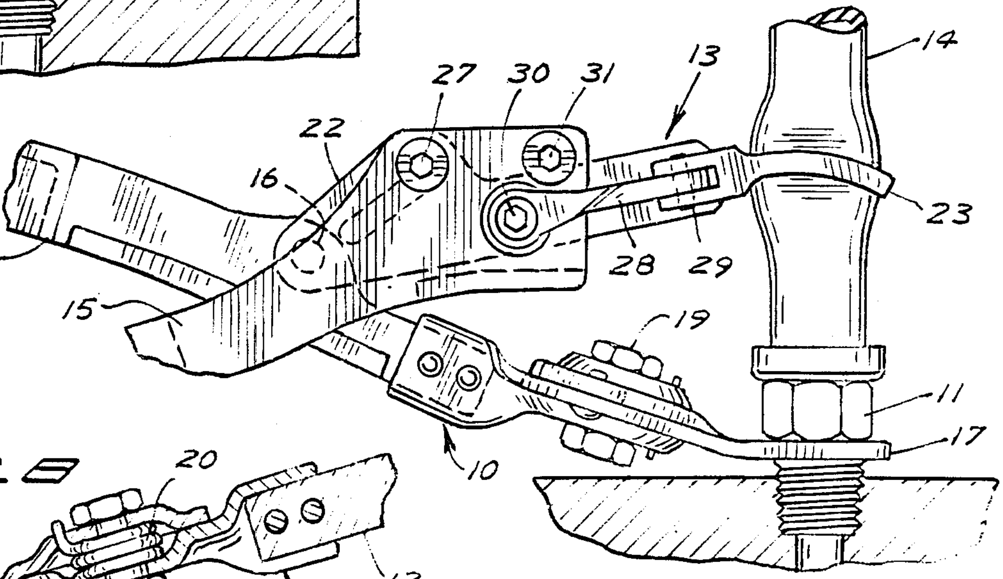
FIG. 7 is an opposite view showing the tool in position as in FIGS. 5 and 6 but from the opposite side.

As best seen in FIG. 6, cam link 22 includes an elongated slot 25 having a locking recess 26 at one end. A pin 27 carried by handle 15 moves reciprooably within slot 25. Slot 25 functions as a guide for relative reciprocal movement between handle 15 and fixed hose engaging jaw 21 so as to cause relative movement between the hose engaging jaw members 21 and 23.

A jaw actuator link 28 is pivotally connected at one end at 29 to movable jaw member 23. The opposite end of actuator link 28 is pivotally connected at 30 to the end of handle 15. It will be noted that the pivot axes of pivots 19, 24 and 29 extend in one direction and those of pivots 16 and 30 extend in a direction displaced 90° from the first. A further pin 31 carried by handle 15 adjacent its end bears against the outside edge of cam link 22 and along with pin 27 functions to guide relative movement between handle 15 and the cam link. This translates into movement of actuator link 28 to cause movable hose engaging jaw member 23 to close toward fixed jaw member 21 to squeeze and compress hose 14 until, at the end of the stroke, pin 27 slips into locking recess 26 to hold the hose engaging jaws in locked position. Then, upon squeezing of the opposite ends of handles 12 and 15, hose 14 is readily forced onto the ridged or barbed nipple portion of fitting 11. When the hose is forced the entire distance onto the fitting, reverse movement of the handles releases the locked hose engaging jaws and the fitting engaging jaws are easily pulled from the fitting.

The sequence of operations by which the push-on pliers is used to assemble a hose and hose fitting is not critical. Preferably, however, the fitting engaging jaws of the pliers are first put in place on the fitting. Then, the free end of the hose to be assembled with the fitting is put in place with the hose lightly engaging the tip end of the fitting nipple. Then, while firmly grasping the first handle 12, with the hose resting lightly between the hose engaging jaw members, the handle 15 is pushed forward to cause relative movement between the handle and cam link 22 sufficient to close the movable jaw member 23 to compress the hose against fixed jaw member 21 and lock the jaws in place. Simply squeezing the ends of the handles together completes the assembly. Separation of the handles releases the pliers from the hose and a slight pull releases them from the fitting. The entire operation may be accomplished in a matter of seconds. The tool may be used to assemble hoses onto fittings already in place in the intended operational application, such as manifolds or the like:

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A push-on hose pliers for assembling hose and hose fittings which comprises:

(A) a first jaw assembly adapted to engage a hose fitting and comprised of:

(1) a fixed jaw member rigidly supported at one end of a first elongated handle, (2) a pivoted movable fitting jaw member cooperatively associated with said fixed jaw member, (3) face-to-face arcuate fitting-grasping jaw recesses in said fixed and movable jaw members to grasp the body of a hose fitting, and (4) spring biasing means urging the jaw members together, (B) a second jaw assembly comprised of a pair of relatively movable jaw members adapted to squeezably engage a hose to be pushed onto said fitting spaced from the end of the hose, said second jaw assembly being supported at one end of a second elongated handle, the centers of the jaws of said jaw assemblies being in approximately longitudinal alignment, and (C) a pivotal connection between said handles spaced from the jaw assemblies, whereby, in a pincer movement, the jaw assemblies are moved toward one another upon movement toward one another of the opposite ends of the handles.

2. A push-on hose pliers according to claim 1 wherein said second jaw assembly comprises:

(A) a fixed hose engaging jaw member rigidly supported at one end of a cam link movably attached to the end of said second handle, the opposite end of said cam link being pivotally attached to said first handle and being the pivotal connection between said handles, (B) a movable hose engaging jaw member pivotally connected to and associated with said fixed jaw for clamping a hose therebetween, and (C) a movable jaw actuator connected between said movable jaw member and the end of said second handle for moving said movable jaw member responsive to longitudinal movement of said second handle.

3. A push-on hose pliers according to claim 2 wherein said cam link includes an elongated slot and said second handle includes a pin engageable and slideable within said slot.

4. A push-on hose pliers according to claim 3 wherein said cam link slot includes a locking recess at its end adjacent to the fixed jaw member, whereby the jaws may be clamped in closed configuration.

5. A push-on hose pliers according to claim 2 wherein said jaw actuator comprises a link pivotally connected at one end to said movable jaw and pivotally connected at the opposite end adjacent to the end of said second handle.

6. A push-on hose pliers according to claim 5 wherein the pivot axes of said movable fitting jaw member, said movable hose engaging jaw member and the connection between the jaw actuator and movable hose engaging jaw member extend in one direction, and the pivot axes of the connection between the cam link and the first handle and the connection between the jaw actuator and the end of the second handle extend in a direction displaced 90° from the first.

7. A push-on hose pliers according to claim 2 wherein said hose engaging jaw members have generally flat face-to-face hose engaging surfaces.

8. A push-on hose pliers for assembling hose and hose fittings which comprises:

(A) a first jaw assembly adapted to engage a hose fitting, said first jaw assembly being supported at one end of a first elongated handle, said first jaw assembly comprising:

(1) a fixed fitting jaw member rigidly supported on said first handle, (2) a pivoted movable fitting jaw member cooperatively associated with said fixed jaw member, (3) face-to-face arcuate fitting grasping jaw recesses in said fixed and movable jaw members to grasp the body of a hose fitting, and (4) spring biasing means urging the jaw members together, and (B) a second jaw assembly adapted to engage a hose to be pushed onto said fitting spaced from the end of the hose, said second jaw assembly being supported at one end of a second elongated handle and comprising:

(1) a fixed generally flat faced hose engaging jaw member rigidly supported at one end of a cam link, movably connected to the end of said second handle, the opposite end of said cam link being pivotally attached to said first handle and forming a pivotal connection between said handles for pincer movement between the handles, said cam link including (a) an elongated slot engageable with a pin carried by said second handle and slideable within said slot, and (b) a locking recess at the end of the slot adjacent to the fixed jaw member and engageable by said pin, (2) a movable generally flat faced hose engaging jaw member pivotally connected to and associated with said fixed jaw member for clamping a hose therebetween, and (3) a movable jaw actuator for moving said movable jaw member responsive to longitudinal movement of said second handle and comprising a link pivotally connected at one end to said movable jaw and pivotally connected at the opposite end adjacent to the end of said second handle.

9. A push-on hose pliers according to claim 8 wherein the pivot axes of said movable fitting jaw member, said movable hose engaging jaw member and the connection between the jaw actuator and movable hose engaging jaw member extend in one direction, and the pivot axes of the connection between the cam link and the first handle and the connnection between the jaw actuator and the end of the second handle extend in a direction displaced 90° from the first.

* * * * *